G. D. SUNDSTRAND.
RELIEVING ATTACHMENT FOR LATHES.
APPLICATION FILED SEPT. 8, 1917.

1,338,757.

Patented May 4, 1920.
3 SHEETS—SHEET 1.

G. D. SUNDSTRAND.
RELIEVING ATTACHMENT FOR LATHES.
APPLICATION FILED SEPT. 8, 1917.

1,338,757.

Patented May 4, 1920.
3 SHEETS—SHEET 2.

Witnesses:
Robert H. Weir
Arthur W. Carlson

Inventor
G. D. Sundstrand.
By Miller, Chindahl & Parker
Attys.

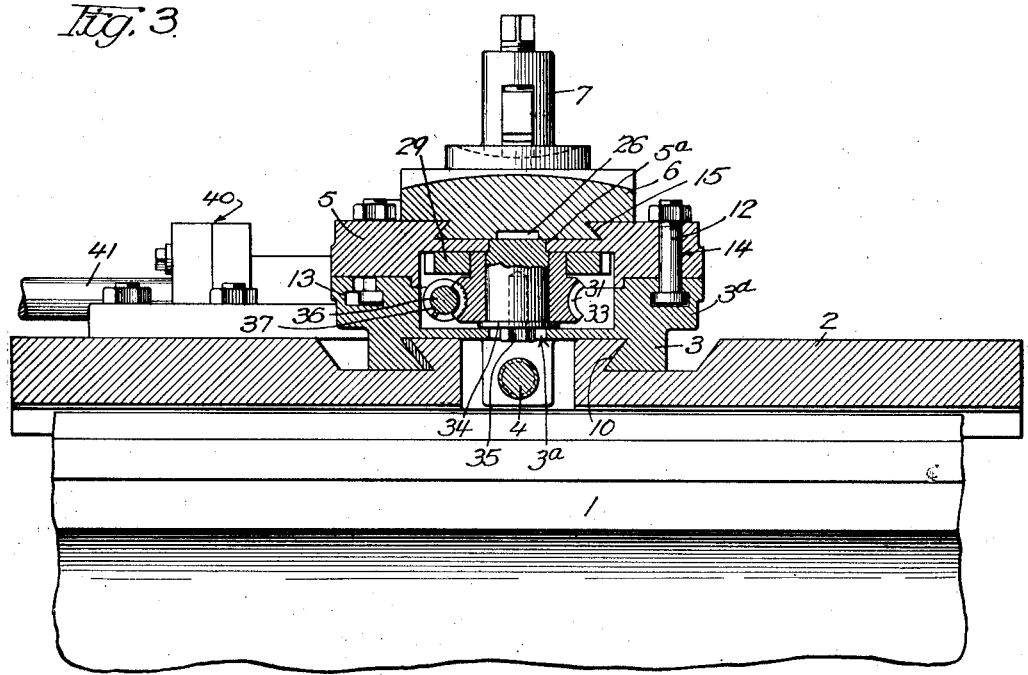
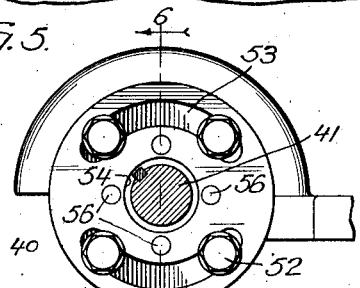
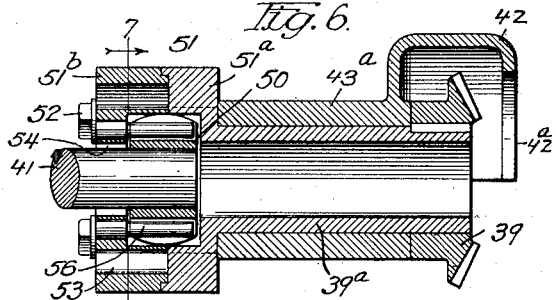
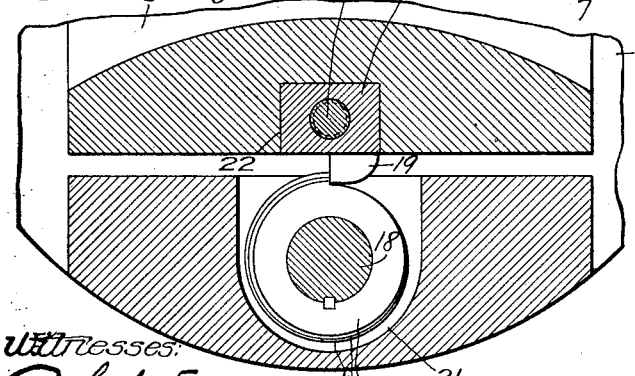
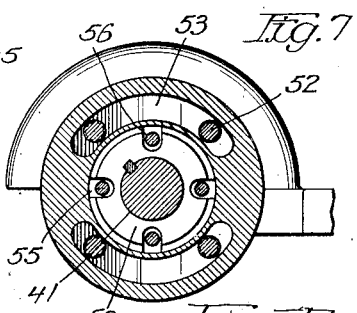

UNITED STATES PATENT OFFICE.

GUSTAF DAVID SUNDSTRAND, OF ROCKFORD, ILLINOIS, ASSIGNOR TO ROCKFORD TOOL COMPANY, OF ROCKFORD, ILLINOIS, A CORPORATION OF ILLINOIS.

RELIEVING ATTACHMENT FOR LATHES.

1,338,757.    Specification of Letters Patent.    Patented May 4, 1920.

Application filed September 8, 1917. Serial No. 190,304.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Relieving Attachments for Lathes, of which the following is a specification.

The invention relates to improvements in lathes and more particularly to a lathe attachment for reciprocating the lathe tool in the operation of forming teeth in cutting tools such as milling hobs, taps, formers and the like, in which the teeth are backed off rearwardly from their cutting edges so as to clear the work upon which the cutting edges are adapted to operate; and the objects of the invention are to provide improved means of simple and practical construction for effecting the relieving movement of the lathe tool, and to provide means for readily varying the extent of movement of the tool to regulate the amount of relief of the teeth rearward of their cutting edges.

Figure 1:
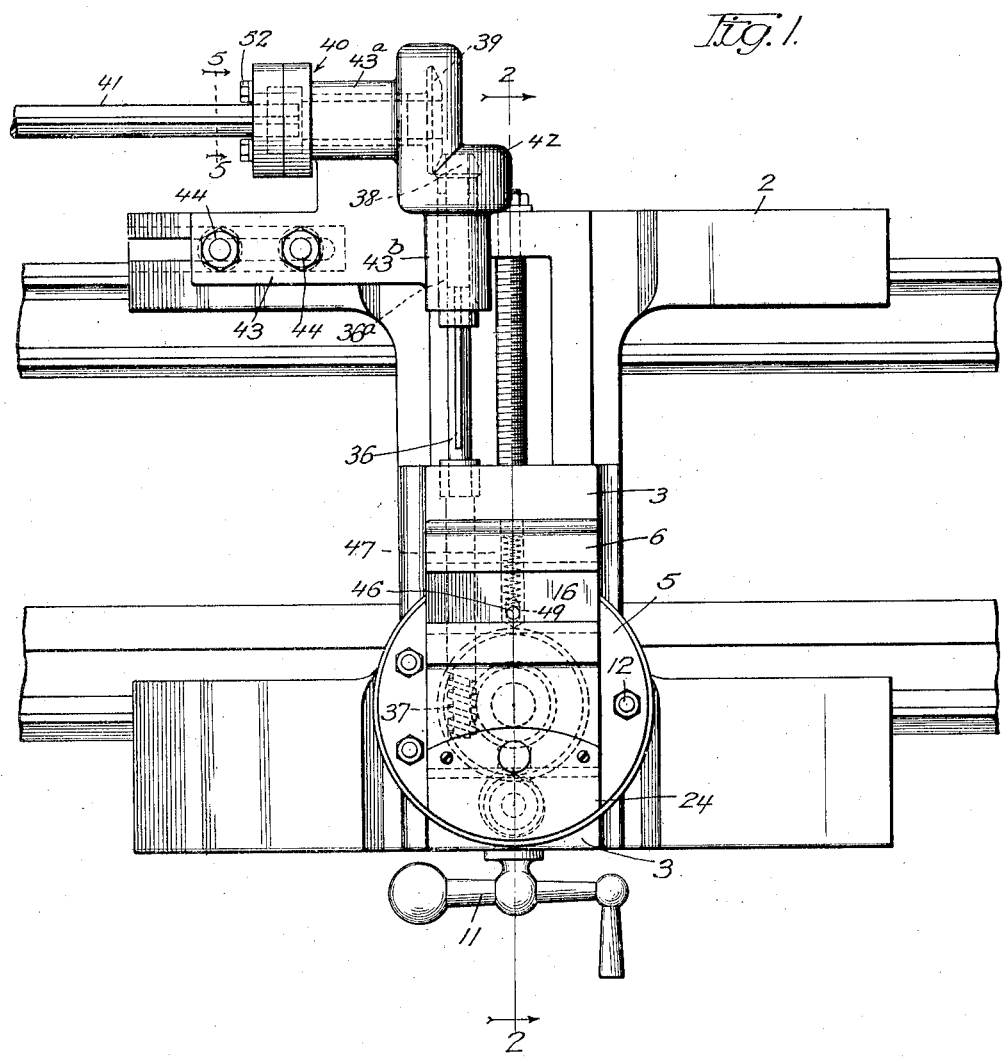
Figure 2:
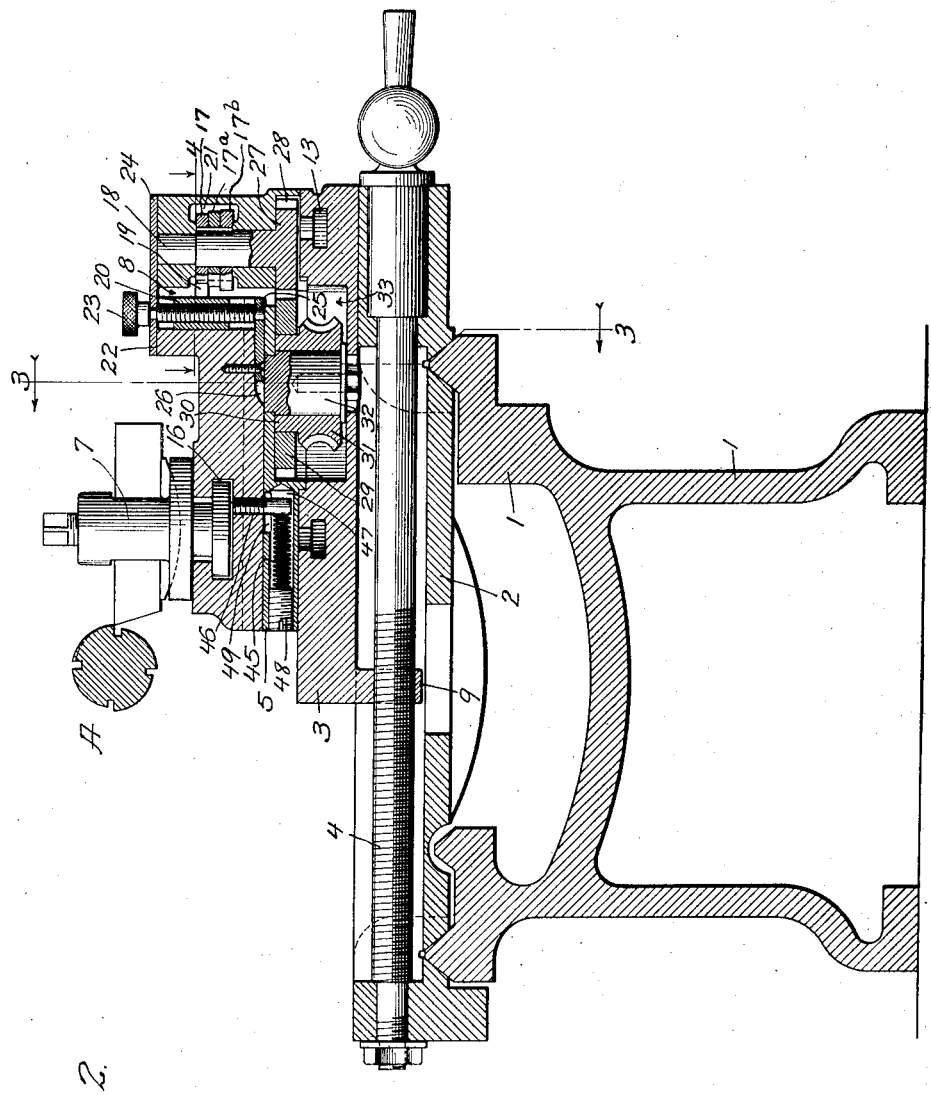

The objects of the invention thus set forth in general terms, together with other and ancillary advantages, are attained by the construction and arrangement illustrated in the accompanying drawings forming part hereof in which Figure 1 is a fragmentary plan view of a lathe embodying my invention showing the carriage and tool slide mounted thereon, the tool support being removed. Fig. 2 is a transverse sectional view through the lathe, slightly enlarged, on line 2—2 of Fig. 1, the tool support being shown in elevation with the tool in operative engagement with the work. Fig. 3 is a sectional view on line 3—3 of Fig. 2. Fig. 4 is a fragmentary sectional view on line 4—4 of Fig. 2 showing the relieving mechanism proper, enlarged. Fig. 5 is an enlarged sectional view of the flexible coupling of the drive shaft taken on line 5—5 of Fig. 1. Fig. 6 is a transverse section on line 6—6 of Fig. 5. Fig. 7 is a sectional view on line 7—7 of Fig. 6.

Similar numerals refer to similar parts throughout the drawings.

The lathe includes the usual stationary bed 1 and the centers (not shown) for supporting the work A to be operated upon; a carriage 2 movable longitudinally of the bed and provided with a cross-slide 3 adapted to be operated by means of a cross-feed screw 4; a supporting block or swivel 5 adjustably secured to the cross-slide 3; a tool slide 6 carried by the swivel and having a tool holder 7 thereon; and mechanism 8 for reciprocating the slide 6 on the cross-slide 3 and swivel 5.

The cross-slide 3 is in the form of a plate of substantial thickness having at its rear end a depending flange 9 and at its forward end a dove-tail connection 10 with the carriage 3. The depending flange 9 is threaded to receive the cross-feed screw 4 which is rotatably mounted transversely of the carriage and provided at its forward end with a crank handle 11, in the usual manner. Said slide is rectangular in form except that near its central portion it is enlarged to form a circular table $3^a$ to which is secured the swivel 5.

The swivel 5 is similar in shape to the cross-slide 3 and is adjustably secured thereto as by means of bolts 12 the heads of which engage in a continuous circular undercut groove 13 provided in the upper face of the cross-slide 3, and the shanks of which extend upwardly through apertures 14 provided in the swivel 5. The groove 13 is shaped to loosely receive the heads and shanks of the bolt so that when their nuts are loosened the support 5 may be readily rotated into any desired position.

Upon the upper surface of the swivel 5 is mounted the tool slide 6 which is substantially rectangular in form and equal in length to the length of the swivel to which it is slidably connected by means of a dove-tail connection 15. In turn, the upper surface of the tool slide is provided with a groove 16 adapted to receive the lower end of the tool holder 7 for supporting it in a well known manner.

The reciprocating mechanism 8 comprises a cam 17 fixed to an upright spindle 18 rotatably mounted in the forward end of the swivel 5, and a bearing lug 19 with which the cam is adapted to engage to move the tool slide rearwardly so as to carry the tool supported thereby into engagement with the work. Preferably a number of additional cams as $17^a$ and $17^b$, are provided on the spindle together with the cam 17, each of said cams having a greater or less throw than the others, and the bearing lug is carried by an adjustable block 20 mounted in the forward end of the tool slide.

The forward portions of the swivel 5 and the tool slide 6 are preferably enlarged upwardly in the form of an L in order to conveniently support the cam spindle 18 and the adjustable block 20, respectively, the upright portions being also spaced a short distance apart, as shown in Figs. 2 and 4. The swivel is provided with a cavity 21 (Fig. 4) opening rearwardly for receiving the cams 17, 17$^a$ and 17$^b$, on the spindle 18; and the tool slide is provided with an upright guideway or groove 22 within which is slidably mounted the adjustable block 20. Said block is adapted to be operated by means of a thumb-screw 23, the upper end of which is rotatably mounted in a plate 24 secured to the upper surface of the tool slide, and the lower end of which is rotatably mounted in a plate 25 located in a recess 26 in the lower forward surface of the tool slide and secured to said slide. The plate 24, in addition to forming a bearing for the upper end of the screw 23, serves to cover the underlying parts.

The ends of the cam spindle 18 are journaled in the swivel 5 and the lower end of said spindle is provided with a pinion 27 operating within a rearwardly opening cavity 28 formed in the lower forward portion of the swivel, the lower wall of said cavity being formed by the upper surface of the cross-slide. The pinion 27 meshes with a spur gear 29 which is fixed to a sleeve 30 formed integrally with a worm wheel 31 and mounted to rotate upon an upright post 32. Said spur gear 29, worm wheel 31 and post 32 are suitably housed within a cavity 33 formed between the cross-slide 3 and swivel 5, substantially centrally thereof, by recessing the upper and lower portions of the cross-slide and swivel, respectively, the upper end of the post 32 being entered through an aperture 5$^a$ (Fig. 3) in the upper wall of the cavity. The lower end of the post is provided with a bearing collar 34 secured to its lower end by means of a bolt 35 entered through an aperture 3$^a$ provided in the lower wall of the cavity 33, said collar bearing upon the inside edges of said aperture to support the post.

The worm wheel 31 is adapted to be rotated by means of a transverse drive shaft 36 having a worm 37 on its forward end and mounted for rotation in the cross-slide 3, the worm wheel meshing with the worm 37. At its opposite or rearward end the transverse shaft is splined to a sleeve 36$^a$ having a bevel gear wheel 38 (Fig. 1) which in turn meshes with a bevel gear wheel 39 fixed on the end of a sleeve 39$^a$ of a flexible coupling 40 which is splined to a driving shaft 41 extending longitudinally of the lathe bed. Said bevel gears 38 and 39 are preferably inclosed within a housing 42 carried by a bracket 43 which is secured to the carriage 2 by means of bolts 44, and provided with bearings 43$^a$ and 43$^b$ formed integral with the housing for supporting the sleeves 39$^a$ and 36$^a$. It will be evident that the connections thus described permit a transverse movement of the cross-slide on the carriage and a longitudinal movement of the carriage on the bed, the housing being cut away as at 42$^a$ to permit the shaft 41 to pass therethrough.

It will be seen that by the construction and arrangement set forth, power transmitted by the driving shafts and their gearing connections, the worm wheel 31, spur gear 29 and pinion 27, will rotate the cam spindle 18 and the cams thereon, one of which cams, engaging with the bearing stud 19 on the adjustable block 20 will move the tool slide rearwardly upon the swivel so that the cutting tool mounted in the tool holder 7 will be forced into engagement with the work which is being simultaneously rotated through other connections (not shown), as well known in the art.

The parts are so proportioned and arranged that while the work is being rotated a distance equal to the arc of one tooth, the cam will be rotated a complete revolution. At the end of such revolution, the tool slide which has been moved rearwardly by the operation of the cam will be moved forwardly to its initial position by means of a spring 45 (Fig. 2) carried by the swivel 5 and bearing against a pin 46 carried by the tool slide 6. Said spring is located within a transverse recess 47 formed in the rear end of the swivel and closed by means of a screw plug 48 against which one end of the spring bears. Near the opposite end of the recess 47 a slot 49 is formed through the upper wall of the recess, through which slot the pin 46 depending from the tool slide 6 extends and is adapted to operate. It will be seen that after the completion of the operation of cutting one tooth, the spring 45 immediately forces the tool slide forwardly into position for operation upon the next succeeding tooth and so on until all of the teeth have been operated upon by the cutting tool as it has been actuated by one of the cams.

When it is desired to vary the degree of relief of the teeth rearward of their cutting edges, it is only necessary to adjust the block 20 by means of the screw 23 to carry the bearing lug 19 into position for engagement by the proper cam. In the present instance, the cams are illustrated as being of gradually increasing size or throw from the upper to the lower, the starting points on each of the cams being uniform so that in each instance the cutting tool is positioned at the same point with reference to the work.

In the operation of relieving a milling hob or the like, the adjustable block 20 is first positioned by the thumb-screw 23 so that the bearing lug 19 may be engaged by the proper cam and the teeth are cut or formed with the desired amount of relief. It will be understood that in this operation the cross-slide 3 remains stationary while the cams move the tool slide, it being only necessary to manipulate the lug 19 to vary the movement of the tool slide and tool.

It will be apparent that my relieving attachment is also capable of use in forming tapering tool cutters, such as tapering taps, reamers and the like. This is accomplished by use of the adjustable swivel upon which the tool slide is mounted, it being evident that when the swivel is properly adjusted the tool slide operating thereon may be caused to move in a direction perpendicular to the face of the work.

A flexible joint is preferably provided in the main drive shaft in order to avoid the necessity of a perfect alinement of the parts, and I have illustrated in Figs. 5, 6 and 7 a preferred form of such coupling consisting of a collar 50 splined to the shaft and mounted within and connected to a hollow sectional head 51 formed on the end of the sleeve 39$^a$ which is journaled in the bearing 43$^a$ of the bracket 43.

The collar 50 is circular in form and provided with a convex or rounded periphery and is neatly fitted within the cavity of the head 51. Said head is formed by enlarging the end of the sleeve 39$^a$ as at 51$^a$ and securing thereto a cup shaped cap 51$^b$ as by means of bolts 52 entered through curved slots 53 in the cap into the sleeve. An opening 54 is provided in the center of the cap for loosely receiving the end of the drive shaft which passes therethrough and is connected to the collar 50; and in its periphery the collar is provided with a plurality of transverse grooves 55, preferably four in number, into each of which a pin 56 mounted in the cap is inserted and adapted to loosely operate.

By this construction, it will be evident that as the drive shaft is rotated the pins 56, operating in the grooves 55 of the collar 50, will rotate the sleeve 49$^a$ and the bevel gear wheel 39, and that by reason of the loose engagement of pins in the grooves, and of the rounded periphery of the block within the cavity of the head, a substantial degree of flexibility is obtained. Furthermore, by reason of the slotted connection of the cap with the sleeve a torsional adjustment of the parts for the purpose of obtaining the desired gearing relationship for the cam movements may be readily accomplished by merely loosening the connecting bolts 52; and in assembling the parts the curved slots in the cap enable the easy insertion of the pins into their grooves in the collar 50.

I claim as my invention:

1. A relieving attachment for lathes comprising, in combination with a tool slide, a relatively stationary upright support at one end of said slide, a spindle journaled in said support and having a cam thereon rotatably mounted in the support, a bearing member on the slide adapted to be engaged by said cam, means for rotating the cam spindle to move the slide, and a cover plate adapted at all times to bridge the space between said support and said slide.

2. A relieving attachment for lathes including a movable tool slide, a spindle having a plurality of cams thereon having various degrees of throw, a screw stem mounted in the tool slide and having a bearing member threaded thereon and adapted to be engaged by one of the cams to move the slide as the spindle is rotated, means for returning the slide to its initial position at the end of each movement, the bearing member being movable by an adjustment of its stem into engagement with any one of the cams, and means for rotating the cam spindle.

3. A relieving attachment for lathes including a movable tool slide, a spindle having a plurality of cams thereon, a screw stem journaled in the tool-slide and having a block threaded thereon, said block having a bearing lug adapted when positioned by an adjustment of said screw stem to be engaged by one of the cams to move the slide as the spindle is rotated, means for returning the slide to its initial position at the end of its movement, and means for rotating the cam spindle.

4. A relieving attachment for lathes having, in combination, a cross-slide, a swivel mounted on said cross-slide and having an upright portion at one end, a cam rotatably mounted in said upright portion of the swivel, a tool-slide mounted on the swivel and having a bearing member at one end arranged to be engaged by the cam in the swivel, means concentric with the swivel for rotating the cam to move the tool-slide in one direction, and means for returning the tool-slide to initial position at the end of each movement thereof by the cam.

5. A relieving attachment for lathes having, in combination, a cross-slide, a swivel mounted on said cross-slide and having an upright portion at one end, a spindle journaled in said upright portion and having a cam thereon, a tool-slide mounted on the swivel and having a bearing member at one end arranged to be engaged by the cam in the swivel, a drive shaft mounted in said swivel concentrically thereof and having a gearing connection with the lower end of said spindle for rotating the cam, and means for returning the tool-slide to initial position at the end of each movement thereof by the cam, said cross-slide and swivel being shaped to form cavities between them for said gearing connection between the drive shaft and spindle.

6. A relieving attachment for lathes having, in combination, a tool-slide, a swivel on which said slide is mounted, and means for reciprocating said slide including a spindle journaled in one end of the swivel and having an operating cam and a drive pinion thereon, a gear wheel carried by the swivel and meshing with said pinion, a drive shaft having a worm, and a worm wheel carried by said swivel concentrically thereof, said worm wheel meshing with said worm and arranged to rotate said gear wheel.

7. A relieving attachment for lathes having, in combination, a cross slide, a swivel on said cross slide, a tool slide on said swivel, a drive shaft concentric with said swivel, means supported by said swivel and operatively connected to said tool slide for causing relative motion between the two, said means being rotatable about an axis offset from the axis of said swivel, and operative connections between said means and said drive shaft.

In testimony whereof I have hereunto set my hand.

GUSTAF DAVID SUNDSTRAND.